(12) United States Patent
Ohara

(10) Patent No.: US 11,972,901 B2
(45) Date of Patent: Apr. 30, 2024

(54) METHOD FOR PRODUCING MULTILAYER CERAMIC ELECTRONIC COMPONENT AND DISAPPEARING INK

(71) Applicant: Murata Manufacturing Co., Ltd., Nagaokakyo (JP)

(72) Inventor: Takashi Ohara, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 139 days.

(21) Appl. No.: 17/210,593

(22) Filed: Mar. 24, 2021

(65) Prior Publication Data

US 2021/0335545 A1    Oct. 28, 2021

(30) Foreign Application Priority Data

Apr. 28, 2020    (JP) ................. 2020-079251

(51) Int. Cl.
*H01G 4/12*    (2006.01)
*B41M 3/00*    (2006.01)
(Continued)

(52) U.S. Cl.
CPC ............ *H01G 4/1209* (2013.01); *B41M 3/00* (2013.01); *C04B 35/62218* (2013.01); *C04B 35/64* (2013.01); *C09D 11/033* (2013.01); *C09D 11/037* (2013.01); *C09D 11/14* (2013.01); *C09D 11/322* (2013.01); *C09D 11/36* (2013.01); *H01G 4/0085* (2013.01); *H01G 4/012* (2013.01);
(Continued)

(58) Field of Classification Search
CPC .... H01G 4/1209; H01G 4/0085; H01G 4/012; H01G 4/232; H01G 4/248; H01G 4/30; C04B 35/62218; C04B 35/64; C04B 2235/6206; C09D 11/033; C09D 11/037; C09D 11/14; C09D 11/322; C09D 11/36
USPC .................................. 427/79, 282
See application file for complete search history.

(56) References Cited

U.S. PATENT DOCUMENTS 3,635,759 A * 1/1972 Howatt .................. H01G 4/30
                                                                    29/25.42
8,048,228 B2 * 11/2011 Kuwajima ............. H01G 2/065
                                                                    156/345.55
(Continued)

FOREIGN PATENT DOCUMENTS

CN    105097279 A    11/2015
JP    2003013107 A    1/2003
(Continued)

OTHER PUBLICATIONS

Office Action in CN202110445348.1, dated Sep. 5, 2022, 14 pages.
Office Action in JP2020-079251, dated Dec. 6, 2022, 4 pages.

*Primary Examiner* — Brian K Talbot
(74) *Attorney, Agent, or Firm* — Keating & Bennett, LLP

(57) ABSTRACT

A method to produce a multilayer ceramic electronic component includes forming supports by an ink jet printing method to produce a green multilayer ceramic capacitor. A green ceramic layer and outer electrodes of the multilayer ceramic electronic component are formed by the ink jet printing method while the supports define peripheries of the green ceramic layer and the outer electrodes. When fired, the green multilayer ceramic electronic component is converted to a sintered multilayer ceramic electronic component, and the supports disappear by heating.

15 Claims, 4 Drawing Sheets

(51) Int. Cl.
| | |
|---|---|
| *C04B 35/622* | (2006.01) |
| *C04B 35/64* | (2006.01) |
| *C09D 11/033* | (2014.01) |
| *C09D 11/037* | (2014.01) |
| *C09D 11/14* | (2006.01) |
| *C09D 11/322* | (2014.01) |
| *C09D 11/36* | (2014.01) |
| *H01G 4/008* | (2006.01) |
| *H01G 4/012* | (2006.01) |
| *H01G 4/232* | (2006.01) |
| *H01G 4/248* | (2006.01) |
| *H01G 4/30* | (2006.01) |
| *B05D 1/26* | (2006.01) |
| *B05D 1/32* | (2006.01) |

(52) U.S. Cl.
CPC ............ *H01G 4/232* (2013.01); *H01G 4/248* (2013.01); *H01G 4/30* (2013.01); *B05D 1/26* (2013.01); *B05D 1/322* (2013.01); *C04B 2235/6026* (2013.01)

(56) References Cited

U.S. PATENT DOCUMENTS

| | | | | |
|---|---|---|---|---|
| 10,937,593 | B2 * | 3/2021 | Hirao | H01H 85/12 |
| 10,957,489 | B2 * | 3/2021 | Ito | H01G 4/30 |
| 11,120,942 | B2 * | 9/2021 | Sato | H01G 4/1272 |
| 2015/0015643 | A1 * | 1/2015 | Oshima | H10N 30/877 |
| | | | | 359/507 |
| 2015/0053643 | A1 * | 2/2015 | Balantrapu | H05K 3/181 |
| | | | | 522/182 |
| 2015/0070818 | A1 * | 3/2015 | Tsuru | C09D 11/322 |
| | | | | 347/100 |
| 2015/0332853 | A1 * | 11/2015 | Kageyama | H01G 4/1209 |
| | | | | 427/79 |
| 2020/0234843 | A1 * | 7/2020 | Okabe | H01G 4/008 |
| 2022/0028617 | A1 * | 1/2022 | Sada | H01G 4/248 |

FOREIGN PATENT DOCUMENTS

| | | | |
|---|---|---|---|
| JP | 2014212239 | A | 11/2014 |
| JP | 2015-216319 | A | 12/2015 |
| JP | 2019176025 | * | 10/2019 |
| JP | 2019176025 | A | 10/2019 |
| JP | 2020027828 | * | 2/2020 |
| JP | 2020027828 | A | 2/2020 |

* cited by examiner

METHOD FOR PRODUCING MULTILAYER CERAMIC ELECTRONIC COMPONENT AND DISAPPEARING INK

CROSS REFERENCE TO RELATED APPLICATIONS

This application claims the benefit of priority to Japanese Patent Application No. 2020-079251 filed on Apr. 28, 2020. The entire contents of this application are hereby incorporated herein by reference.

BACKGROUND OF THE INVENTION

1. Field of the Invention

The present invention relates to a method for producing a multilayer ceramic electronic component, and a disappearing ink including a material that disappears by heating, and also relates to a method for producing a multilayer ceramic electronic component using an ink jet printing method, and a disappearing ink suitable for the production method.

2. Description of the Related Art

Japanese Unexamined Patent Application Publication No. 2015-216319 describes a method for producing a ceramic electronic component using an ink jet printing method. Unlike a screen printing method, for example, an ink jet printing method does not use a printing plate and can, therefore, be used high-mix low-volume production, and is suitable to form a print having a complicated pattern.

A multilayer ceramic capacitor is an example of a ceramic electronic component to which the production method described in Japanese Unexamined Patent Application Publication No. 2015-216319 is applied. A multilayer ceramic capacitor typically includes a component main body and an outer electrode located on an outer surface of the component main body. The component main body has a multilayer structure including laminated ceramic layers and an internal electrode arranged along the interface between the ceramic layers. The outer electrode is electrically connected to the internal electrode.

To produce such a multilayer ceramic capacitor, as described in Japanese Unexamined Patent Application Publication No. 2015-216319, the step of forming a green ceramic layer by an ink jet printing method, the step of forming a green internal electrode by the ink jet printing method, and the step of forming an outer electrode by the ink jet printing method are repeated in a predetermined order to produce a green multilayer ceramic capacitor, and the green multilayer ceramic capacitor is then fired to complete the multilayer ceramic capacitor.

Japanese Unexamined Patent Application Publication No. 2015-216319 describes selecting an appropriate pigment volume concentration range of an ink used in the ink jet printing method to reduce structural defects in a ceramic electronic component that is produced.

As described above, the ink jet printing method can be used for high-mix low-volume production and is suitable to form a print having a complicated pattern. When the ink jet printing method is applied to a method for producing a multilayer ceramic electronic component, however, shape retention in the course of production may become a problem. Thus, it is desired to improve the accuracy of the shape of the finished product.

SUMMARY OF THE INVENTION

Preferred embodiments of the present invention provide methods for producing multilayer ceramic electronic components, which each are able to overcome the problem of shape retention during production, and disappearing inks that are each able to be advantageously used in the production method.

A preferred embodiment of the present invention is directed to a method for producing a multilayer ceramic electronic component that includes a component main body and an outer electrode on an outer surface of the component main body, the component main body including laminated ceramic layers and an internal electrode along an interface between the ceramic layers, the outer electrode being electrically connected to the internal electrode.

A production method according to a preferred embodiment of the present invention includes a first stage of producing a green multilayer ceramic electronic component, which is to be a multilayer ceramic electronic component, and subsequently, a second stage of producing a sintered multilayer ceramic electronic component from the green multilayer ceramic electronic component.

In the first stage, first, a disappearing ink including a material that disappears by heating, a ceramic-containing ink that is to be fired to form the ceramic layers, a first metal-containing ink that is to be fired to form the internal electrode, and a second metal-containing ink that is to be fired to form the outer electrode are prepared.

The first stage includes ejecting the disappearing ink by an ink jet method to form a support that defines at least a portion of an external shape of the green multilayer ceramic electronic component, ejecting the ceramic-containing ink by the ink jet method to form a green ceramic layer, which is to be the ceramic layer, ejecting the first metal-containing ink by the ink jet method to form a green internal electrode, which is to be the internal electrode, and ejecting the second metal-containing ink by the ink jet method to form a green outer electrode, which is to be the outer electrode.

The forming the green ceramic layer and the forming the green outer electrode are performed while the support defines at least a portion of a periphery of the green ceramic layer and the green outer electrode, respectively.

The second stage causing the support to disappear by heating and sintering the green multilayer ceramic electronic component are performed. In the second stage, while the firing atmosphere is maintained, about 80% or more by volume of the support may disappear, for example, at the temperature range of about 300° C. to about 800° C., without reducing or preventing the shrinkage of the green multilayer ceramic electronic component while firing, and no residue remains after completion of the firing.

Preferred embodiments of the present invention are also directed to disappearing inks each including a material that disappears by heating and suitably used to form the support in the methods for producing multilayer ceramic electronic components.

A disappearing ink according to a preferred embodiment of the present invention includes an organic material powder including at least one of an organic pigment and a particulate polymer, a polycarboxylic acid copolymer as a dispersant, at least one selected from methoxybutanol, ethylene glycol, and 1,3-butanediol as a solvent, and at least one selected from cellulose resins, acrylic resins, and poly(vinyl butyral) resins as a resin.

In the first stage of a method for producing a multilayer ceramic electronic component according to a preferred embodiment of the present invention, which is the stage of forming the multilayer ceramic electronic component, a disappearing ink is ejected by an ink jet method to form a support that defines at least a portion of the external shape of a green multilayer ceramic electronic component, and a green ceramic layer and a green outer electrode are formed by an ink jet printing method while the support defines the periphery of the green ceramic layer and the green outer electrode. Thus, in the first stage, the support forcibly defines the external shape of the green multilayer ceramic electronic component including at least the ceramic layer and the outer electrode and properly maintains the external shape just before the second stage. Consequently, a multilayer ceramic electronic component is able to be produced with high form accuracy.

In methods for producing multilayer ceramic electronic components according to preferred embodiments of the present invention, a support, a ceramic layer, an internal electrode, and an outer electrode are formed by an ink jet printing method. Thus, the production methods are each able to be readily used for high-mix low-volume production and are each also able to be satisfactorily applied to an internal electrode and an outer electrode with a complicated pattern.

Disappearing inks according to preferred embodiments of the present invention each disappear without residues by heating. Thus, a support formed by using the disappearing inks eliminates the need for post-treatment of the multilayer ceramic electronic component after firing, such as removal of the support, and increases the productivity of the multilayer ceramic electronic component.

In disappearing inks according to preferred embodiments of the present invention, as can be seen from experimental examples described later, the sedimentation rate of an organic material powder is sufficiently decreased even with a small amount of resin. Thus, the disappearing inks used in ink jet printing methods each achieve smooth and stable printing.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
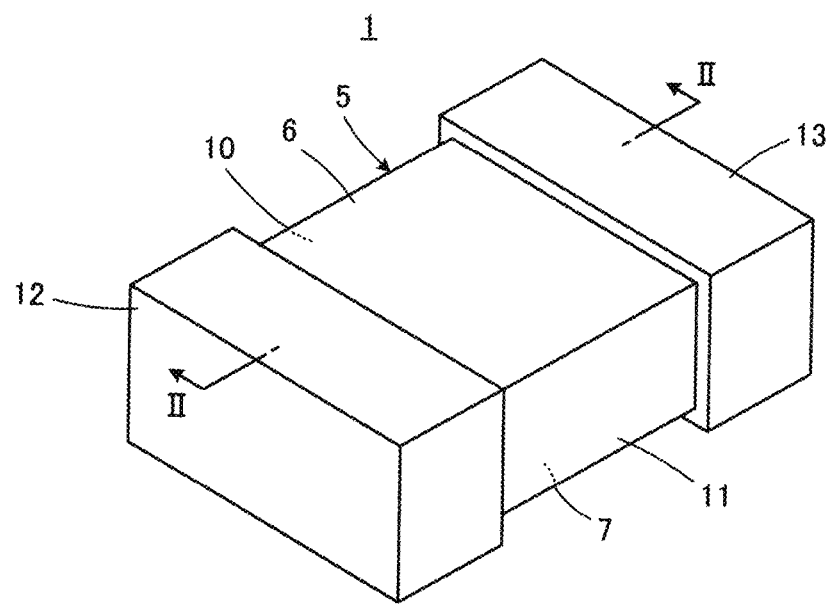
FIG. 1 is a perspective view of a multilayer ceramic capacitor as an example of a multilayer ceramic electronic component produced by a production method according to a preferred embodiment of the present invention.
Figure 2:
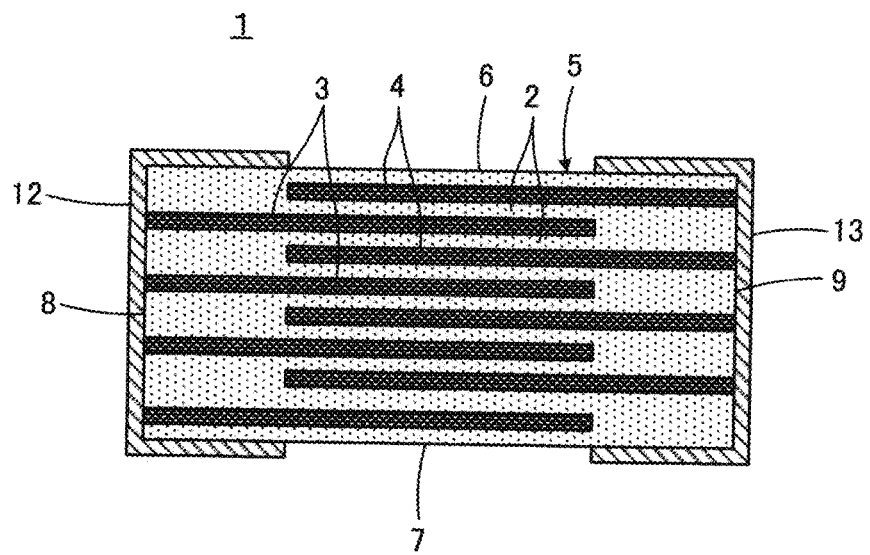
FIG. 2 is a cross-sectional view taken along the line II-II of the multilayer ceramic capacitor illustrated in FIG. 1.

Referring to FIGS. 1 and 2, a multilayer ceramic capacitor 1 as an example of a multilayer ceramic electronic component produced by a production method according to a preferred embodiment of the present invention is described below.

The multilayer ceramic capacitor 1 includes a component main body 5 with a multilayer structure, which includes laminated ceramic layers 2 and first internal electrodes 3 and second internal electrodes 4 along the interface between the ceramic layers 2. The component main body 5 has a rectangular parallelepiped shape or a substantially rectangular parallelepiped shape. In the multilayer ceramic capacitor 1, the ceramic layers are made of a dielectric ceramic, for example. The first internal electrodes 3 and the second internal electrodes 4 are alternately arranged in the lamination direction of the component main body 5 and face each other with the ceramic layers 2 interposed therebetween to produce electrostatic capacity.

The component main body 5 includes a first main surface 6 and a second main surface 7, which extend in the longitudinal direction of the ceramic layers 2 and face each other, a first end surface 8 and a second end surface 9, which extend in the direction perpendicular or substantially perpendicular to the main surfaces 6 and 7 and face each other, and a first side surface 10 and a second side surface 11, which extend in the direction perpendicular or substantially perpendicular to the main surfaces 6 and 7 and the end surfaces 8 and 9 and face each other.

A first outer electrode 12 and a second outer electrode 13 are provided on the outer surface of the component main body 5, more specifically, for example, on the first and second end surfaces 8 and 9, respectively. The first outer electrode 12 extends from the first end surface 8 of the component main body 5 to portions of the first and second main surfaces 6 and 7 and the first and second side surfaces 10 and 11 adjacent to the first end surface 8. The second outer electrode 13 extends from the second end surface 9 of the component main body 5 to portions of the first and second main surfaces 6 and 7 and the first and second side surfaces 10 and 11 adjacent to the second end surface 9.

The first internal electrodes 3 extend to the first end surface 8 of the component main body 5 and are electrically connected to the first outer electrode 12. The second internal electrodes 4 extend to the second end surface 9 of the component main body 5 and are electrically connected to the second outer electrode 13.

Next, a non-limiting example of a method for producing the multilayer ceramic capacitor 1 according to a preferred embodiment of the present invention is described with reference to FIGS. 3 to 7.

The production of the multilayer ceramic capacitor 1 includes a first stage of producing a green multilayer ceramic capacitor 20, which is to be the multilayer ceramic capacitor 1, and subsequently, a second stage of producing the sintered multilayer ceramic capacitor 1 from the green multilayer ceramic capacitor 20.

In the first stage, the following inks are prepared: a disappearing ink, a ceramic-containing ink that is to be fired to form the ceramic layers 2, a first metal-containing ink that is to be fired to form the internal electrodes 3 and 4, and a second metal-containing ink that is to be fired to form the outer electrodes 12 and 13.

The disappearing ink is to form supports 21-1 to 21-8 (see FIG. 7, for example) that define at least a portion of the external shape of the multilayer ceramic capacitor 1 or the green multilayer ceramic capacitor 20 to be produced. The supports 21-1 to 21-8 are not needed in multilayer ceramic capacitor 1. Thus, the disappearing ink to form the supports 21-1 to 21-8 is made of a material that disappears by heating.

The disappearing ink includes an organic material powder including, for example, at least one of an organic pigment and a particulate polymer (preferably a spherical particulate polymer, for example), a polycarboxylic acid copolymer as a dispersant, at least one selected from methoxybutanol, ethylene glycol, and 1,3-butanediol as a solvent, and at least one selected from cellulose resins, acrylic resins, and poly (vinyl butyral) resins as a resin.

In the disappearing ink, the ratio (PVC) of the volume of the organic material powder to the total volume of the organic material powder and the resin preferably ranges from about 60% to about 90%, and more preferably from about 75% to about 80%, for example. As can be seen from experimental examples described later, the sedimentation rate of the organic material powder can be sufficiently decreased even with such a small amount of resin. Thus, the disappearing ink enables smooth and stable ink jet printing.

The organic pigment of the organic material powder preferably includes, for example, at least one selected from quinacridones (Pigment Red 57:1, Pigment Violet 19, etc.), Pigment Yellow 180, and copper phthalocyanines (Pigment Blue 15:3, etc.).

When a cellulose resin is included as a resin in the disappearing ink, the cellulose resin preferably includes, for example, an aqueous cellulose resin. More specifically, the aqueous cellulose resin preferably includes, for example, hydroxypropyl cellulose.

When methoxybutanol is used as a solvent in the disappearing ink, the ink ejection behavior in the ink jet printing method may be improved, for example, by using methoxybutanol as a mixed solvent with ethylene glycol and/or 1,3-butanediol instead of using methoxybutanol alone.

For example, a ceramic powder in the ceramic-containing ink can be a powder including at least one selected from $SrTiO_3$, $CaZrO_3$, $MgO$, $SiO_2$, $Al_2O_3$, $Cr_2O_3$, $MnO_2$, $Y_2O_3$, $CaTi$, $ZrO_3$, $SrZrO_3$, $BaTiO_3$, $BaTi$, and $CaO_3$.

For example, a powder containing at least one selected from Ni, Fe, Cu, Al, Ag, W, C, Au, Sn, Pd, Pt, Mn, Li, and Si can be used as a metal powder in the first metal-containing ink or the second metal-containing ink. The metal powder in the first metal-containing ink may be different from or the same as the metal powder in the second metal-containing ink.

The ceramic-containing ink is preferably the disappearing ink in which the organic material powder is replaced with an inorganic material powder, such as a ceramic powder, for example. The first metal-containing ink and the second metal-containing ink are preferably the disappearing ink in which the organic material powder is replaced with an inorganic material powder, such as a metal powder, for example. Thus, as in the disappearing ink, the sedimentation rate of the inorganic material powder can be sufficiently decreased even with a small amount of resin.

Thus, the ceramic-containing ink, the first metal-containing ink, and the second metal-containing ink preferably include, for example, in addition to the inorganic material powder, a polycarboxylic acid copolymer as a dispersant, at least one selected from methoxybutanol, ethylene glycol, and 1,3-butanediol as a solvent, and at least one selected from cellulose resins, acrylic resins, and poly(vinyl butyral) resins as a resin.

Figure 3:
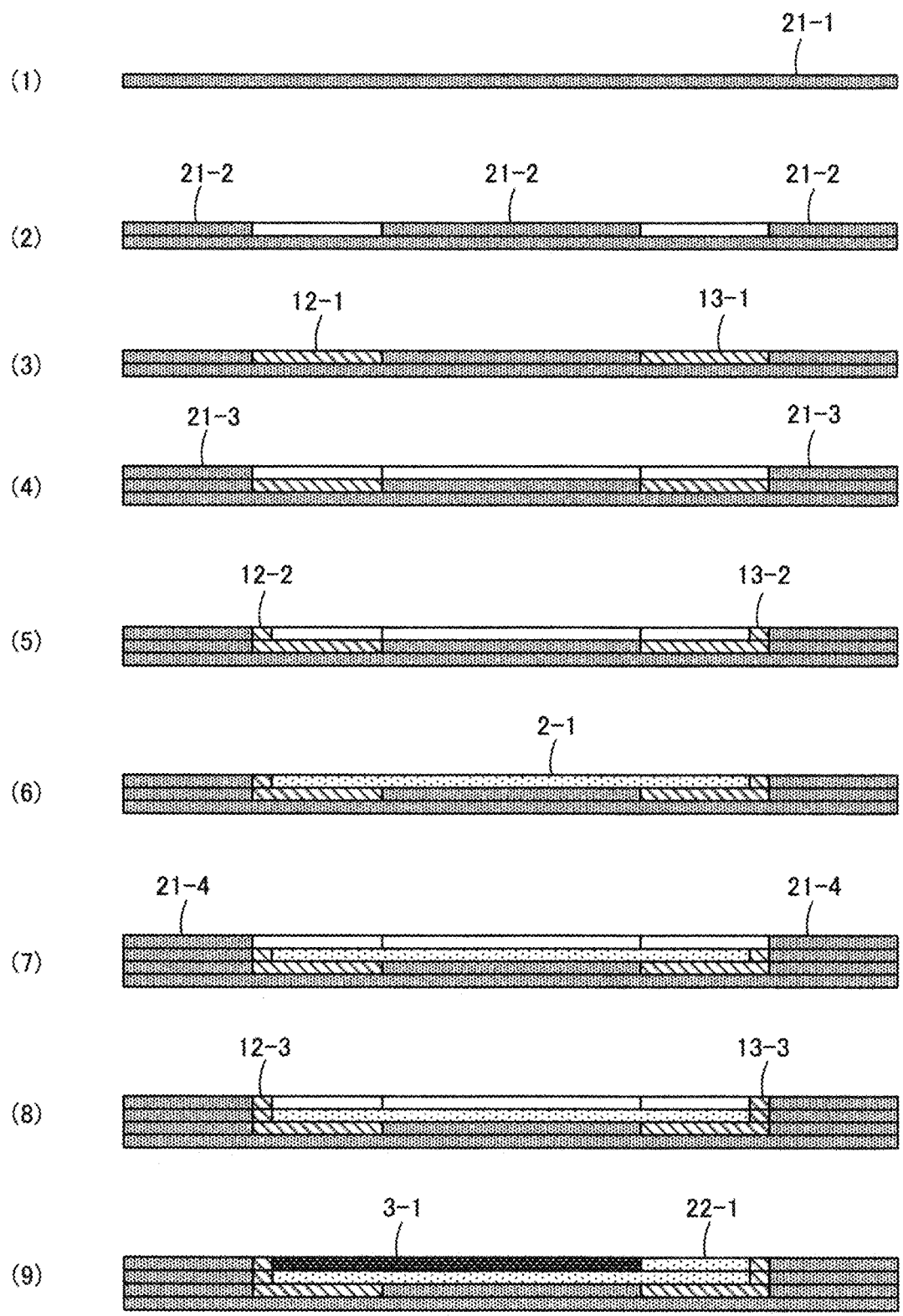
FIG. 3 is a cross-sectional view sequentially illustrating the steps (1) to (9) in the first stage of a method for producing the multilayer ceramic capacitor according to a preferred embodiment of the present invention.

After the disappearing ink, the ceramic-containing ink, the first metal-containing ink, and the second metal-containing ink are prepared as described above, the disappearing ink is ejected by the ink jet method to form the support 21-1, as illustrated in FIG. 3(1). The support 21-1 is then dried, if necessary. Although not described, the drying step is performed, if necessary, after ink jet printing in the subsequent steps.

Next, as illustrated in FIG. 3(2), the disappearing ink is ejected by the ink jet method to form the support 21-2.

In FIGS. 3 to 6, to make it easy to determine which element is added in each illustrated step, only elements added after the step immediately before the illustrated step are denoted by reference numerals.

Next, as illustrated in FIG. 3(3), the second metal-containing ink is ejected by the ink jet method to form green outer electrodes 12-1 and 13-1, which are to be the outer electrodes 12 and 13. At this time, the support 21-2 defines the periphery of the green outer electrodes 12-1 and 13-1. The green outer electrodes 12-1 and 13-1 correspond to portions of the outer electrodes 12 and 13 located on the second main surface 7 of the component main body 5.

Next, as illustrated in FIG. 3(4), the disappearing ink is ejected by the ink jet method to form the support 21-3.

Next, as illustrated in FIG. 3(5), the second metal-containing ink is ejected by the ink jet method to form green outer electrodes 12-2 and 13-2, which are to be the outer electrodes 12 and 13. At this time, the support 21-3 defines a portion of the periphery of the green outer electrodes 12-2 and 13-2.

Next, as illustrated in FIG. 3(6), the ceramic-containing ink is ejected by the ink jet method to form a green ceramic layer 2-1, which is to be a ceramic layer 2. At this time, the support 21-3 defines a portion of the periphery of the green ceramic layer 2-1.

Next, as illustrated in FIG. 3(7), the disappearing ink is ejected by the ink jet method to form the support 21-4.

Next, as illustrated in FIG. 3(8), the second metal-containing ink is ejected by the ink jet method to form green outer electrodes 12-3 and 13-3, which are to be the outer electrodes 12 and 13. At this time, the support 21-4 defines a portion of the periphery of the green outer electrodes 12-3 and 13-3.

Next, as illustrated in FIG. 3(9), the first metal-containing ink is ejected by the ink jet method to form a green internal electrode 3-1, which is to be a first internal electrode 3.

The green internal electrode 3-1 has a predetermined thickness. To compensate for the step caused by this thickness, preferably, as illustrated in FIG. 3(9), the ceramic-containing ink is ejected by the ink jet method to form a green step compensation layer 22-1 with the same or substantially the same thickness as the green internal electrode 3-1. The step of forming the green step compensation layer 22-1 may be performed simultaneously with the step of forming the green internal electrode 3-1. Alternatively, these steps may be performed at different times, for example, one of these steps may be performed before the other.

Figure 4:
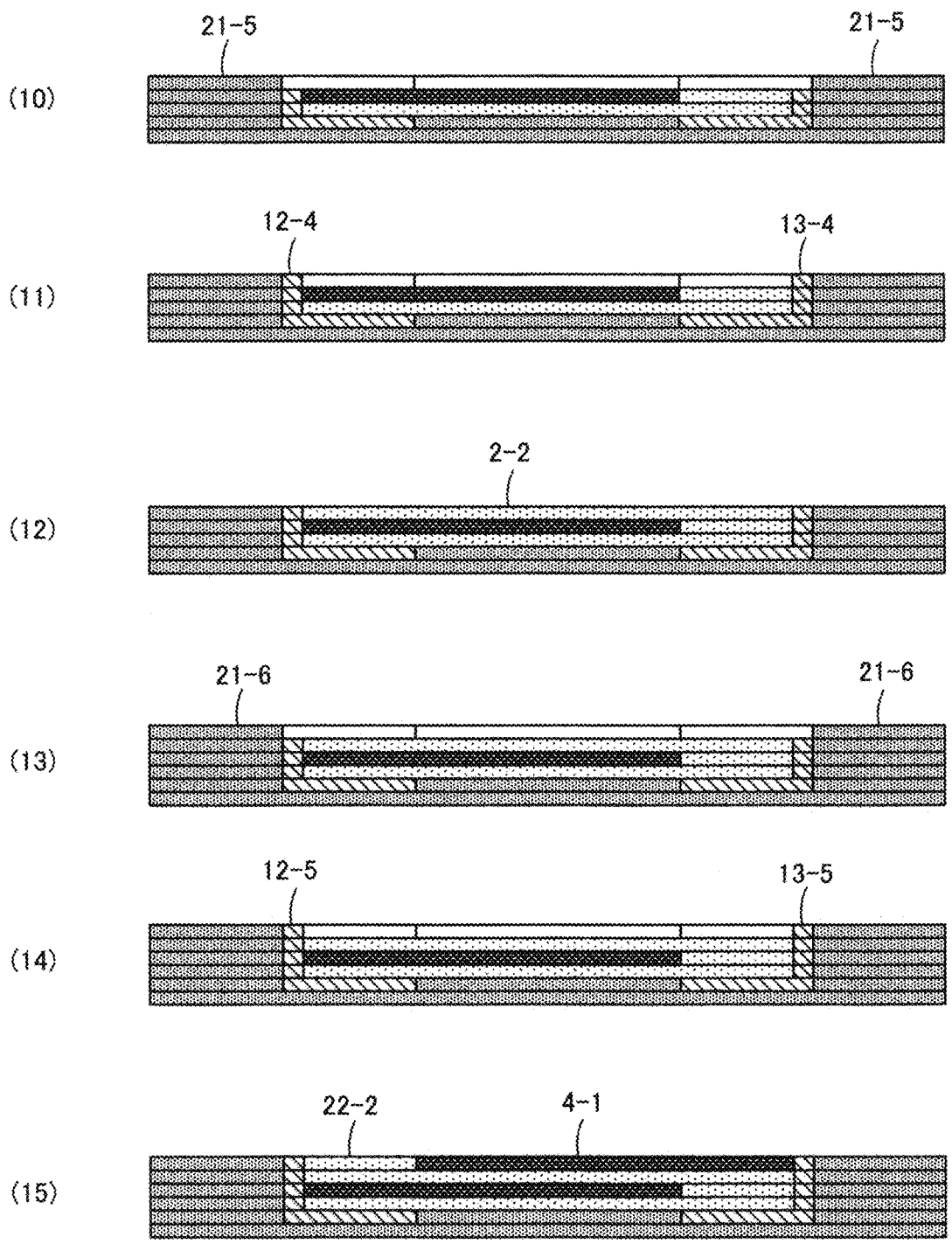
FIG. 4 is a cross-sectional view sequentially illustrating the steps (10) to (15) following the step (9) of FIG. 3 in the first stage of the method for producing the multilayer ceramic capacitor.

Next, as illustrated in FIG. 4(10), the disappearing ink is ejected by the ink jet method to form the support 21-5.

Next, as illustrated in FIG. 4(11), the second metal-containing ink is ejected by the ink jet method to form green outer electrodes 12-4 and 13-4, which are to be the outer electrodes 12 and 13. At this time, the support 21-5 defines a portion of the periphery of the green outer electrodes 12-4 and 13-4.

Next, as illustrated in FIG. 4(12), the ceramic-containing ink is ejected by the ink jet method to form a green ceramic layer 2-2, which is to be a ceramic layer 2. At this time, the support 21-5 defines a portion of the periphery of the green ceramic layer 2-2.

Next, as illustrated in FIG. 4(13), the disappearing ink is ejected by the ink jet method to form the support 21-6.

Next, as illustrated in FIG. 4(14), the second metal-containing ink is ejected by the ink jet method to form green outer electrodes 12-5 and 13-5, which are to be the outer electrodes 12 and 13. At this time, the support 21-6 defines a portion of the periphery of the green outer electrodes 12-5 and 13-5.

Next, as illustrated in FIG. 4(15), the first metal-containing ink is ejected by the ink jet method to form a green internal electrode 4-1, which is to be a second internal electrode 4. Furthermore, the ceramic-containing ink is ejected by the ink jet method to form a green step compensation layer 22-2 with the same or substantially the same thickness as the green internal electrode 4-1.

Figure 5:
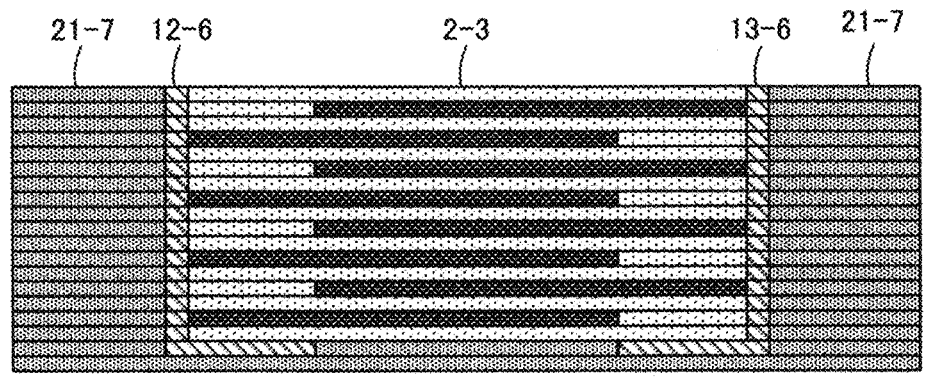
FIG. 5 is a cross-sectional view of a structure of the multilayer ceramic capacitor during production after appropriately repeating steps corresponding to the steps (10) to (15) of FIG. 4.

Subsequently, steps corresponding to the steps (10) to (15) illustrated in FIG. 4 are repeated as many times as needed. Consequently, the structure of the multilayer ceramic capacitor 1 illustrated in FIG. 5 is formed. The support 21-7, green outer electrodes 12-6 and 13-6, and a green ceramic layer 2-3 are formed on the top layer of the structure in FIG. 5.

Figure 6:
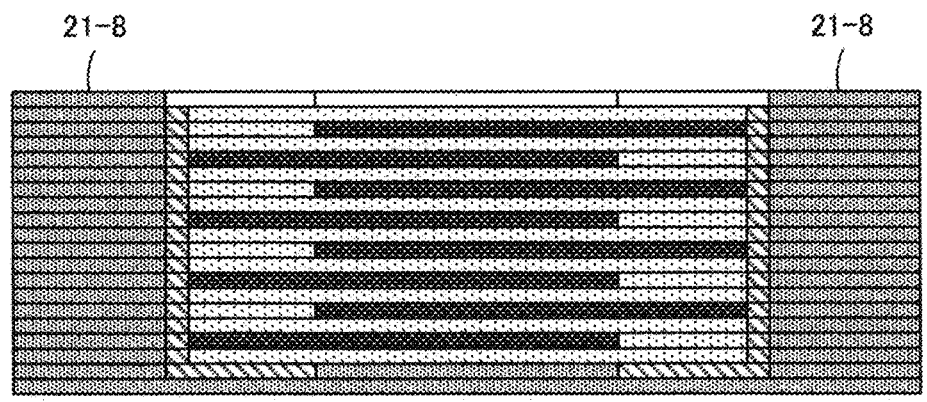
FIG. 6 is a cross-sectional view of a step following the step of FIG. 5 in the first stage of the method for producing the multilayer ceramic capacitor.

Next, as illustrated in FIG. 6, the disappearing ink is ejected by the ink jet method to form the support 21-8.

Figure 7:
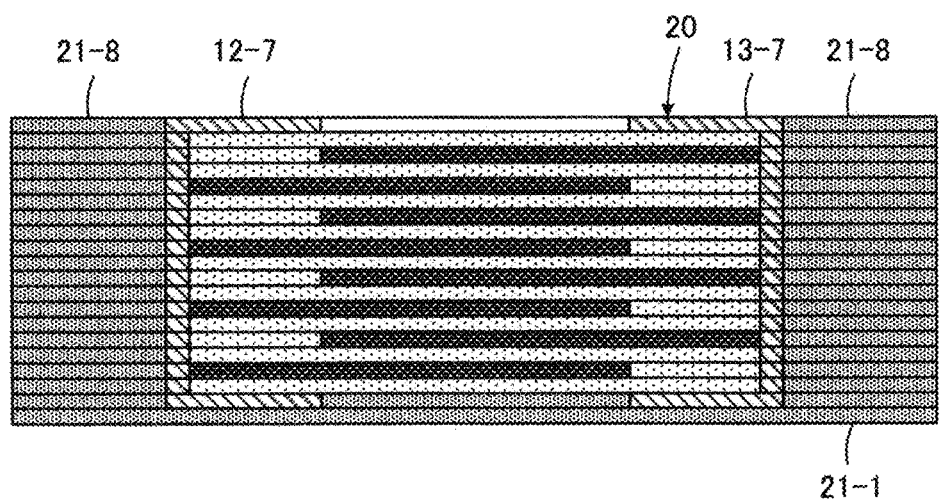
FIG. 7 is a cross-sectional view of a step following the step of FIG. 6 and is a cross-sectional view of a structure including a green multilayer ceramic capacitor after the first stage and before the second stage of the method for producing the multilayer ceramic capacitor.

Next, as illustrated in FIG. 7, the second metal-containing ink is ejected by the ink jet method to form green outer electrodes 12-7 and 13-7, which are to be the outer electrodes 12 and 13. At this time, the support 21-8 defines a portion of the periphery of the green outer electrodes 12-7 and 13-7. The green outer electrodes 12-7 and 13-7 correspond to portions of the outer electrodes 12 and 13 located on the first main surface 6 of the component main body 5.

Thus, the first stage of the method for producing the multilayer ceramic capacitor 1 is completed, and the green multilayer ceramic capacitor 20 supported by the supports 21-1 to 21-8 is formed.

Required numbers of the supports, the green outer electrodes, the green internal electrodes, and the green step compensation layers in the first stage are preferably sequentially formed with individual ink jet heads by a three-dimensional ink jet printing method.

Next, the second stage of the method for producing the multilayer ceramic capacitor 1 is described below. The second stage includes the step of heating the green multilayer ceramic capacitor 20 to cause the supports 21-1 to 21-8 to disappear and the step of firing the green multilayer ceramic capacitor 20 to sinter the green multilayer ceramic capacitor 20. When the second stage is completed, the sintered multilayer ceramic capacitor 1 illustrated in FIGS. 1 and 2 is obtained.

The step of firing the green multilayer ceramic capacitor 20 typically includes degreasing and subsequent firing. The supports 21-1 to 21-8 are removed during such a series of firing steps. More specifically, while the firing atmosphere is maintained, about 80% or more by volume of the supports 21-1 to 21-8 disappears, for example, at the temperature range of about 300° C. to about 800° C. without reducing or preventing the shrinkage of the green multilayer ceramic capacitor 20 while firing, and no residue remains after completion of the firing.

FIGS. 2 and 7 schematically illustrate the multilayer ceramic capacitor 1 and the green multilayer ceramic capacitor 20, respectively. In an actual product, for example, the number of laminated layers of the internal electrodes 3 and 4 in FIG. 2 is typically larger than that shown.

FIGS. 3 to 7 show the steps of producing one multilayer ceramic capacitor 1. For the mass production of multilayer ceramic capacitors, for example, in the first stage, the in-plane dimensions of the supports 21-1 to 21-8 illustrated in FIG. 7 are increased, and a plurality of green multilayer ceramic capacitors 20 distributed in the in-plane direction of the supports 21-1 to 21-8 are produced. In this case, in the second stage, the supports 21-1 to 21-8 are removed to separate the multilayer ceramic capacitors 1.

In the multilayer ceramic capacitor 1, the first outer electrode 12 extends the first internal electrodes 3 to the outside and electrically connects the first internal electrodes 3 to each other. Similarly, the second outer electrode 13 extends the second internal electrodes 4 to the outside and electrically connects the second internal electrodes 4 to each other. The first outer electrode 12 electrically connecting the first internal electrodes 3 to each other may be provided by a first via-conductor provided inside the component main body 5, and the second outer electrode 13 electrically connecting the second internal electrodes 4 to each other may be provided by a second via-conductor provided inside the component main body 5. Thus, the production method described above can be applied even when via-conductors are used.

Although a non-limiting example of a method for producing a multilayer ceramic electronic component according to a preferred embodiment of the present invention has been described with reference to a multilayer ceramic capacitor, the present invention can also be applied to methods for producing multilayer ceramic electronic components other than the multilayer ceramic capacitor, such as multilayer ceramic substrates, multilayer batteries, LC filters, connectors, and coils, for example.

The following are examples of mass ratios of specific preferred compositions of a disappearing ink according to a preferred embodiment of the present invention including Pigment Red 57:1, Pigment Violet 19, Pigment Yellow 180, Pigment Blue 15:3, or a spherical particulate polymer (resin beads) as an organic material powder. In these component ratios, the ratio (PVC) of the volume of the organic material powder to the total volume of the organic material powder and the resin ranges from 75% to 80%.

(1) When Pigment Red 57:1 or Pigment Violet 19 is Used:
    organic material powder about 8.36 to about 8.37 parts by mass
    solvent about 90.18 to about 89.63 parts by mass;
    dispersant about 0.58 to about 0.59 parts by mass;
    resin about 0.80 to about 1.28 parts by mass; and
    plasticizer about 0.08 to about 0.13 parts by mass.

(2) When Pigment Yellow 180 is Used:
    organic material powder about 8.35 to about 8.37 parts by mass;
    solvent about 90.14 to about 89.59 parts by mass;
    dispersant about 0.29 parts by mass;
    resin about 1.11 to about 1.58 parts by mass; and
    plasticizer about 0.11 to about 0.16 parts by mass.

(3) When Pigment Blue 15:3 is Used:
    organic material powder about 8.35 to about 8.34 parts by mass;

solvent about 90.17 to about 89.66 parts by mass;
dispersant about 0.54 parts by mass;
resin about 0.85 to about 1.32 parts by mass; and
plasticizer about 0.08 to about 0.13 parts by mass.
(4) When Spherical Particulate Polymer is Used:
organic material powder about 6.10 to about 6.09 parts by mass;
solvent about 91.85 to about 90.37 parts by mass;
dispersant about 0.43 parts by mass;
resin about 1.00 to 1.48 parts by mass; and
plasticizer about 0.10 to about 0.15 parts by mass.

Experimental examples performed on a disappearing ink according to a preferred embodiment of the present invention are described below.

Experimental Example 1

A disappearing ink in Experimental Example 1 included Pigment Red 57:1 and Pigment Violet 19 as organic material powders.

The disappearing ink included an aqueous cellulose resin, more specifically, a cellulose resin "hydroxypropyl cellulose" manufactured by Nippon Soda Co., Ltd. as a resin.

To prepare the disappearing ink, the organic material powder, a polycarboxylic acid copolymer as a dispersant, and a solvent in the column of "Solvent" in Table 1 were mixed in a ball mill at a rotation rate of about 150 rpm for about 16 hours to adhere the dispersant to the organic material powder. The mixture was then mixed with the resin in the ball mill at a rotation rate of about 150 rpm for about 4 hours. The mixture was then filtered once with a filter with a pore size of about 1 μm to remove the organic material powder and impurities with a particle size of more than about 1 μm. The solvent was then added again to the mixture to adjust the viscosity to about 30 mPa·s or less measured at the shear rate of about 1000 s$^{-1}$.

Thus, disappearing inks of Examples 1 to 10 and Comparative Examples 11 to 18 with the compositions listed in Table 1 were prepared as samples.

A to F in the column of "Solvent" in the composition of Table 1 denote:
A: EKINEN (trade name)
B: methoxybutanol
C: isopropyl alcohol
D: ethanol
E: 1,3-butanediol
F: ethylene glycol.

"B+F" denotes a mixed solvent of methoxybutanol and ethylene glycol at a mass ratio of 1:1.

"PVC" in the composition of Table 1 denotes the percentage of the volume of the organic material powder with respect to the total volume of the organic material powder and the resin.

The characteristics in Table 1 were evaluated as described below.

"1000 s$^{-1}$ viscosity": The viscosity was measured about 3 seconds after the beginning of measurement at a shear rate of about 1000 s$^{-1}$ with a cone rheometer "MCR301" manufactured by Anton Paar GmbH. The cone rheometer had a cone with a diameter of about 50 mm (CP50). The temperature was about 25° C.±2° C.

"Sedimentation rate": The sedimentation rate was determined from a transmitted light profile measured with "LUMiSizer 651" manufactured by Nihon Rufuto Co., Ltd. The measurement results were analyzed in an integration mode and were converted into the amount of transmitted light per unit time as "sedimentation rate". The "sedimentation rate" in Table 1 indicates the rate of change in a certain measurement range as a relative comparison value and may therefore be more than 100%/h.

"Long-term stability": The viscosity and sedimentation rate were measured three months after the preparation of the disappearing ink to confirm whether or not the disappearing ink changed over time. A change of less than about ±10% of the initial characteristic was rated as "good", and a change of about ±10% or more was rated as "poor".

"Ejection performance/printability": The ink was ejected with a piezoelectric ink jet printer. No separation from a main droplet and no bleeding in the print were indicated by "good", and bleeding in the print was indicated by "poor".

TABLE 1

| | | Composition | | | | | | | | Characteristics | | | |
|---|---|---|---|---|---|---|---|---|---|---|---|---|---|
| | | Organic material | Solvent | PVC | Percentage of organic material (mass %) | Percentage of solvent (mass %) | Percentage of dispersant (mass %) | Percentage of resin (mass %) | Percentage of plasticizer (mass %) | 1000 s$^{-1}$ viscosity (mPa·s) | Sedimentation rate (%/h) | Long-term stability | Ejection performance/ printability |
| Example | 1 | Red57:1 | B | 80 | 8.36 | 90.18 | 0.58 | 0.80 | 0.08 | 20 | 4.3 | Good | Good |
| | 2 | ↑ | E | ↑ | ↑ | ↑ | ↑ | ↑ | ↑ | 25 | 4.1 | Good | Good |
| | 3 | ↑ | F | ↑ | ↑ | ↑ | ↑ | ↑ | ↑ | 25 | 4.7 | Good | Good |
| | 4 | ↑ | B + F | ↑ | ↑ | ↑ | ↑ | ↑ | ↑ | 25 | 4.3 | Good | Good |
| | 5 | ↑ | B | 75 | 8.37 | 89.63 | 0.59 | 1.28 | 0.13 | 30 | 3.8 | Good | Good |
| | 6 | Violet-19 | B | 80 | 8.36 | 90.18 | 0.58 | 0.80 | 0.08 | 20 | 1.8 | Good | Good |
| | 7 | ↑ | E | ↑ | ↑ | ↑ | ↑ | ↑ | ↑ | 25 | 3.5 | Good | Good |
| | 8 | ↑ | F | ↑ | ↑ | ↑ | ↑ | ↑ | ↑ | 25 | 3.9 | Good | Good |
| | 9 | ↑ | B + F | ↑ | ↑ | ↑ | ↑ | ↑ | ↑ | 20 | 3.7 | Good | Good |
| | 10 | ↑ | B | 75 | 8.37 | 89.63 | 0.59 | 1.28 | 0.13 | 30 | 3.1 | Good | Good |
| Comparative example | 11 | Red57:1 | A | 80 | 8.36 | 90.18 | 0.58 | 0.80 | 0.08 | 20 | 100.2 | Poor | Poor |
| | 12 | ↑ | C | ↑ | ↑ | ↑ | ↑ | ↑ | ↑ | 20 | 103.2 | Poor | Poor |
| | 13 | ↑ | D | ↑ | ↑ | ↑ | ↑ | ↑ | ↑ | 20 | 107.2 | Poor | Poor |
| | 14 | ↑ | A | 75 | 8.37 | 89.63 | 0.59 | 1.28 | 0.13 | 20 | 110.6 | Poor | Poor |
| | 15 | Violet-19 | A | 80 | 8.36 | 90.18 | 0.58 | 0.80 | 0.08 | 20 | 100.3 | Poor | Poor |
| | 16 | ↑ | C | ↑ | ↑ | ↑ | ↑ | ↑ | ↑ | 20 | 102.2 | Poor | Poor |
| | 17 | ↑ | D | ↑ | ↑ | ↑ | ↑ | ↑ | ↑ | 20 | 101.9 | Poor | Poor |
| | 18 | ↑ | A | 75 | 8.37 | 89.63 | 0.59 | 1.28 | 0.13 | 20 | 111.3 | Poor | Poor |

The description of the composition and the methods of evaluating the characteristics in Table 1 are the same in Tables 2 to 12.

Table 1 shows that in the samples of Examples 1 to 10 within the scope of preferred embodiments of the present invention, in which the aqueous cellulose resin was used as a resin, and methoxybutanol, 1,3-butanediol, and/or ethylene glycol was used as a solvent, the "sedimentation rate" was as low as about 4.7%/h or less, and the "long-term stability" and "ejection performance/printability" were rated as "good".

By contrast, in the samples of Comparative Examples 11 to 18 outside the scope of preferred embodiments of the present invention, in which the aqueous cellulose resin was used as a resin, and EKINEN, isopropyl alcohol, or ethanol was used as a solvent, the "sedimentation rate" was as high as about 100.2%/h or more, and the "long-term stability" and "ejection performance/printability" were rated as "poor".

Although not shown in Table 1, the use of a non-aqueous cellulose resin, such as ethyl cellulose, for example, instead of the aqueous cellulose resin, such as hydroxypropyl cellulose, for example, increased the sedimentation rate by about 10% to about 20%.

Experimental Example 2

In Experimental Example 2, disappearing inks of Examples 21 to 30 and Comparative Examples 31 to 38 with the compositions listed in Table 2 were prepared as samples in the same or substantially the same manner as in Experimental Example 1, except that an acrylic resin was used as a resin in the disappearing inks. More specifically, the acrylic resin was "Dianal" manufactured by Mitsubishi Chemical Corporation.

TABLE 2

| | | | | | Composition | | | | | | Characteristics | | |
|---|---|---|---|---|---|---|---|---|---|---|---|---|---|
| | | Organic material | Solvent | PVC | Percentage of organic material (mass %) | Percentage of solvent (mass %) | Percentage of dispersant (mass %) | Percentage of resin (mass %) | Percentage of plasticizer (mass %) | $1000\ s^{-1}$ viscosity (mPa·s) | Sedimentation rate (%/h) | Long-term stability | Ejection performance/printability |
| Example | 21 | Red57:1 | B | 80 | 8.36 | 90.18 | 0.58 | 0.80 | 0.08 | 20 | 9.3 | Good | Good |
| | 22 | ↑ | E | ↑ | ↑ | ↑ | ↑ | ↑ | ↑ | 25 | 9.1 | Good | Good |
| | 23 | ↑ | F | ↑ | ↑ | ↑ | ↑ | ↑ | ↑ | 25 | 9.8 | Good | Good |
| | 24 | ↑ | B + F | ↑ | ↑ | ↑ | ↑ | ↑ | ↑ | 25 | 9.6 | Good | Good |
| | 25 | ↑ | B | 75 | 8.37 | 89.63 | 0.59 | 1.28 | 0.13 | 30 | 8.9 | Good | Good |
| | 26 | Violet-19 | B | 80 | 8.36 | 90.18 | 0.58 | 0.80 | 0.08 | 20 | 3.9 | Good | Good |
| | 27 | ↑ | E | ↑ | ↑ | ↑ | ↑ | ↑ | ↑ | 25 | 4.3 | Good | Good |
| | 28 | ↑ | F | ↑ | ↑ | ↑ | ↑ | ↑ | ↑ | 25 | 4.9 | Good | Good |
| | 29 | ↑ | B + F | ↑ | ↑ | ↑ | ↑ | ↑ | ↑ | 20 | 4.4 | Good | Good |
| | 30 | ↑ | B | 75 | 8.37 | 89.63 | 0.59 | 1.28 | 0.13 | 30 | 4.1 | Good | Good |
| Comparative example | 31 | Red57:1 | A | 80 | 8.36 | 90.18 | 0.58 | 0.80 | 0.08 | 20 | 110.2 | Poor | Poor |
| | 32 | ↑ | C | ↑ | ↑ | ↑ | ↑ | ↑ | ↑ | 20 | 112.3 | Poor | Poor |
| | 33 | ↑ | D | ↑ | ↑ | ↑ | ↑ | ↑ | ↑ | 20 | 119.2 | Poor | Poor |
| | 34 | ↑ | A | 75 | 8.37 | 89.63 | 0.59 | 1.28 | 0.13 | 20 | 120.2 | Poor | Poor |
| | 35 | Violet-19 | A | 80 | 8.36 | 90.18 | 0.58 | 0.80 | 0.08 | 20 | 110.2 | Poor | Poor |
| | 36 | ↑ | C | ↑ | ↑ | ↑ | ↑ | ↑ | ↑ | 20 | 122.3 | Poor | Poor |
| | 37 | ↑ | D | ↑ | ↑ | ↑ | ↑ | ↑ | ↑ | 20 | 124.9 | Poor | Poor |
| | 38 | ↑ | A | 75 | 8.37 | 89.63 | 0.59 | 1.28 | 0.13 | 20 | 124.6 | Poor | Poor |

Table 2 shows that in the samples of Examples 21 to 30 within the scope of preferred embodiments of the present invention, in which the acrylic resin was used as a resin, and methoxybutanol, 1,3-butanediol, and/or ethylene glycol was used as a solvent, the "sedimentation rate" was as low as about 9.8%/h or less, and the "long-term stability" and "ejection performance/printability" were rated as "good".

By contrast, in the samples of Comparative Examples 31 to 38 outside the scope of preferred embodiments of the present invention, in which the acrylic resin was used as a resin, and EKINEN, isopropyl alcohol, or ethanol was used as a solvent, the "sedimentation rate" was as high as about 110.2%/h or more, and the "long-term stability" and "ejection performance/printability" were rated as "poor".

Experimental Example 3

In Experimental Example 3, disappearing inks of Examples 41 to 50 and Comparative Examples 51 to 58 with the compositions listed in Table 3 were prepared as samples in the same or substantially the same manner as in Experimental Example 1 except that a poly(vinyl butyral) resin was used as a resin in the disappearing inks. More specifically, the poly(vinyl butyral) resin was "S-Lec" manufactured by Sekisui Chemical Co., Ltd.

TABLE 3

| | | | | | Composition | | | | | | Characteristics | | |
|---|---|---|---|---|---|---|---|---|---|---|---|---|---|
| | | Organic material | Solvent | PVC | Percentage of organic material (mass %) | Percentage of solvent (mass %) | Percentage of dispersant (mass %) | Percentage of resin (mass %) | Percentage of plasticizer (mass %) | $1000\ s^{-1}$ viscosity (mPa·s) | Sedimentation rate (%/h) | Long-term stability | Ejection performance/printability |
| Example | 41 | Red57:1 | B | 80 | 8.36 | 90.18 | 0.58 | 0.80 | 0.08 | 20 | 10.1 | Good | Good |
| | 42 | ↑ | E | ↑ | ↑ | ↑ | ↑ | ↑ | ↑ | 25 | 11.1 | Good | Good |
| | 43 | ↑ | F | ↑ | ↑ | ↑ | ↑ | ↑ | ↑ | 25 | 10.4 | Good | Good |
| | 44 | ↑ | B + F | ↑ | ↑ | ↑ | ↑ | ↑ | ↑ | 25 | 10.3 | Good | Good |
| | 45 | ↑ | B | 75 | 8.37 | 89.63 | 0.59 | 1.28 | 0.13 | 30 | 9.9 | Good | Good |
| | 46 | Violet-19 | B | 80 | 8.36 | 90.18 | 0.58 | 0.80 | 0.08 | 20 | 3.9 | Good | Good |
| | 47 | ↑ | E | ↑ | ↑ | ↑ | ↑ | ↑ | ↑ | 25 | 12.9 | Good | Good |
| | 48 | ↑ | F | ↑ | ↑ | ↑ | ↑ | ↑ | ↑ | 25 | 11.2 | Good | Good |
| | 49 | ↑ | B + F | ↑ | ↑ | ↑ | ↑ | ↑ | ↑ | 20 | 10.7 | Good | Good |
| | 50 | ↑ | B | 75 | 8.37 | 89.63 | 0.59 | 1.28 | 0.13 | 30 | 10.2 | Good | Good |
| Comparative example | 51 | Red57:1 | A | 80 | 8.36 | 90.18 | 0.58 | 0.80 | 0.08 | 20 | 111.4 | Poor | Poor |
| | 52 | ↑ | C | ↑ | ↑ | ↑ | ↑ | ↑ | ↑ | 20 | 114.4 | Poor | Poor |
| | 53 | ↑ | D | ↑ | ↑ | ↑ | ↑ | ↑ | ↑ | 20 | 119.4 | Poor | Poor |
| | 54 | ↑ | A | 75 | 8.37 | 89.63 | 0.59 | 1.28 | 0.13 | 20 | 114.9 | Poor | Poor |
| | 55 | Violet-19 | A | 80 | 8.36 | 90.18 | 0.58 | 0.80 | 0.08 | 20 | 110.4 | Poor | Poor |
| | 56 | ↑ | C | ↑ | ↑ | ↑ | ↑ | ↑ | ↑ | 20 | 130.9 | Poor | Poor |
| | 57 | ↑ | D | ↑ | ↑ | ↑ | ↑ | ↑ | ↑ | 20 | 129.2 | Poor | Poor |
| | 58 | ↑ | A | 75 | 8.37 | 89.63 | 0.59 | 1.28 | 0.13 | 20 | 129.4 | Poor | Poor |

Table 3 shows that in the samples of Examples 41 to 50 within the scope of preferred embodiments of the present invention, in which the poly(vinyl butyral) resin was used as a resin, and methoxybutanol, 1,3-butanediol, and/or ethylene glycol was used as a solvent, the "sedimentation rate" was as low as about 12.9%/h or less, and the "long-term stability" and "ejection performance/printability" were rated as "good".

By contrast, in the samples of Comparative Examples 51 to 58 outside the scope of preferred embodiments of the present invention, in which the poly(vinyl butyral) resin was used as a resin, and EKINEN, isopropyl alcohol, or ethanol was used as a solvent, the "sedimentation rate" was as high as about 110.4%/h or more, and the "long-term stability" and "ejection performance/printability" were rated as "poor".

Experimental Example 4

A disappearing ink in Experimental Example 4 included Pigment Yellow 180 as an organic material powder.

As in Experimental Example 1, the disappearing ink included an aqueous cellulose resin, more specifically, the cellulose resin "hydroxypropyl cellulose" manufactured by Nippon Soda Co., Ltd. as a resin.

Disappearing inks of Examples 61 to 65 and Comparative Examples 66 to 69 with the compositions listed in Table 4 were prepared as samples in the same or substantially the same manner as in Experimental Example 1.

TABLE 4

| | | Organic material | Solvent | PVC | Percentage of organic material (mass %) | Percentage of solvent (mass %) | Percentage of dispersant (mass %) | Percentage of resin (mass %) | Percentage of plasticizer (mass %) | 1000 s⁻¹ viscosity (mPa · s) | Sedimentation rate (%/h) | Long-term stability | Ejection performance/printability |
|---|---|---|---|---|---|---|---|---|---|---|---|---|---|
| Example | 61 | Yellow-180 | B | 80 | 8.35 | 90.14 | 0.29 | 1.11 | 0.11 | 20 | 25.6 | Good | Good |
| | 62 | ↑ | E | ↑ | ↑ | ↑ | ↑ | ↑ | ↑ | 25 | 26.5 | Good | Good |
| | 63 | ↑ | F | ↑ | ↑ | ↑ | ↑ | ↑ | ↑ | 25 | 28.7 | Good | Good |
| | 64 | ↑ | B + F | ↑ | ↑ | ↑ | ↑ | ↑ | ↑ | 25 | 27.1 | Good | Good |
| | 65 | ↑ | B | 75 | 8.37 | 89.59 | 0.29 | 1.58 | 0.16 | 30 | 26.6 | Good | Good |
| Comparative example | 66 | Yellow-180 | A | 80 | 8.35 | 90.14 | 0.29 | 1.11 | 0.11 | 20 | 133.3 | Poor | Poor |
| | 67 | ↑ | C | ↑ | ↑ | ↑ | ↑ | ↑ | ↑ | 20 | 136.9 | Poor | Poor |
| | 68 | ↑ | D | ↑ | ↑ | ↑ | ↑ | ↑ | ↑ | 20 | 142.1 | Poor | Poor |
| | 69 | ↑ | A | 75 | 8.37 | 89.59 | 0.29 | 1.58 | 0.16 | 20 | 144.2 | Poor | Poor |

Table 4 shows that in the samples of Examples 61 to 65 within the scope of preferred embodiments of the present invention, in which the aqueous cellulose resin was used as a resin, and methoxybutanol, 1,3-butanediol, and/or ethylene glycol was used as a solvent, the "sedimentation rate" was as low as about 28.7%/h or less, and the "long-term stability" and "ejection performance/printability" were rated as "good".

By contrast, in the samples of Comparative Examples 66 to 69 outside the scope of preferred embodiments of the present invention, in which the aqueous cellulose resin was used as a resin, and EKINEN, isopropyl alcohol, or ethanol was used as a solvent, the "sedimentation rate" was as high as about 133.3%/h or more, and the "long-term stability" and "ejection performance/printability" were rated as "poor".

Although not shown in Table 4, also in Experimental Example 4, the use of a non-aqueous cellulose resin, ethyl cellulose, instead of the aqueous cellulose resin, hydroxypropyl cellulose, increased the sedimentation rate by about 10% to about 20%.

Experimental Example 5

In Experimental Example 5, disappearing inks of Examples 71 to 75 and Comparative Examples 76 to 79 with the compositions listed in Table 5 were prepared as samples in the same or substantially the same manner as in Experimental Example 4 except that an acrylic resin was used as a resin in the disappearing inks. More specifically, as in Experimental Example 2, the acrylic resin was "Dianal" manufactured by Mitsubishi Chemical Corporation.

TABLE 5

| | | Organic material | Solvent | PVC | Percentage of organic material (mass %) | Percentage of solvent (mass %) | Percentage of dispersant (mass %) | Percentage of resin (mass %) | Percentage of plasticizer (mass %) | 1000 s⁻¹ viscosity (mPa · s) | Sedimentation rate (%/h) | Long-term stability | Ejection performance/printability |
|---|---|---|---|---|---|---|---|---|---|---|---|---|---|
| Example | 71 | Yellow-180 | B | 80 | 8.35 | 90.14 | 0.29 | 1.11 | 0.11 | 20 | 28.2 | Good | Good |
| | 72 | ↑ | E | ↑ | ↑ | ↑ | ↑ | ↑ | ↑ | 25 | 27.9 | Good | Good |
| | 73 | ↑ | F | ↑ | ↑ | ↑ | ↑ | ↑ | ↑ | 25 | 29.2 | Good | Good |
| | 74 | ↑ | B + F | ↑ | ↑ | ↑ | ↑ | ↑ | ↑ | 25 | 28.4 | Good | Good |
| | 75 | ↑ | B | 75 | 8.37 | 89.59 | 0.29 | 1.58 | 0.16 | 30 | 29.1 | Good | Good |
| Comparative example | 76 | Yellow-180 | A | 80 | 8.35 | 90.14 | 0.29 | 1.11 | 0.11 | 20 | 149.9 | Poor | Poor |
| | 77 | ↑ | C | ↑ | ↑ | ↑ | ↑ | ↑ | ↑ | 20 | 158.3 | Poor | Poor |
| | 78 | ↑ | D | ↑ | ↑ | ↑ | ↑ | ↑ | ↑ | 20 | 156.3 | Poor | Poor |
| | 79 | ↑ | A | 75 | 8.37 | 89.59 | 0.29 | 1.58 | 0.16 | 20 | 155.3 | Poor | Poor |

Table 5 shows that in the samples of Examples 71 to 75 within the scope of preferred embodiments of the present invention, in which the acrylic resin was used as a resin, and methoxybutanol, 1,3-butanediol, and/or ethylene glycol was used as a solvent, the "sedimentation rate" was as low as about 29.2%/h or less, and the "long-term stability" and "ejection performance/printability" were rated as "good".

By contrast, in the samples of Comparative Examples 76 to 79 outside the scope of preferred embodiments of the present invention, in which the acrylic resin was used as a resin, and EKINEN, isopropyl alcohol, or ethanol was used as a solvent, the "sedimentation rate" was as high as about 149.9%/h or more, and the "long-term stability" and "ejection performance/printability" were rated as "poor".

Experimental Example 6

In Experimental Example 6, disappearing inks of Examples 81 to 85 and Comparative Examples 86 to 89 with the compositions listed in Table 6 were prepared as samples in the same or substantially the manner as in Experimental Example 4 except that a poly(vinyl butyral) resin was used as a resin in the disappearing inks. More specifically, as in Experimental Example 3, the poly(vinyl butyral) resin was "S-Lec" manufactured by Sekisui Chemical Co., Ltd.

TABLE 6

| | | Organic material | Solvent | PVC | Percentage of organic material (mass %) | Percentage of solvent (mass %) | Percentage of dispersant (mass %) | Percentage of resin (mass %) | Percentage of plasticizer (mass %) | 1000 s$^{-1}$ viscosity (mPa · s) | Sedimentation rate (%/h) | Long-term stability | Ejection performance/printability |
|---|---|---|---|---|---|---|---|---|---|---|---|---|---|
| Example | 81 | Yellow-180 | B | 80 | 8.35 | 90.14 | 0.29 | 1.11 | 0.11 | 20 | 31.1 | Good | Good |
| | 82 | ↑ | E | ↑ | ↑ | ↑ | ↑ | ↑ | ↑ | 25 | 31.3 | Good | Good |
| | 83 | ↑ | F | ↑ | ↑ | ↑ | ↑ | ↑ | ↑ | 25 | 32.1 | Good | Good |
| | 84 | ↑ | B + F | ↑ | ↑ | ↑ | ↑ | ↑ | ↑ | 25 | 33.4 | Good | Good |
| | 85 | ↑ | B | 75 | 8.37 | 89.59 | 0.29 | 1.58 | 0.16 | 30 | 33.1 | Good | Good |
| Comparative example | 86 | Yellow-180 | A | 80 | 8.35 | 90.14 | 0.29 | 1.11 | 0.11 | 20 | 160.2 | Poor | Poor |
| | 87 | ↑ | C | ↑ | ↑ | ↑ | ↑ | ↑ | ↑ | 20 | 155.2 | Poor | Poor |
| | 88 | ↑ | D | ↑ | ↑ | ↑ | ↑ | ↑ | ↑ | 20 | 159.3 | Poor | Poor |
| | 89 | ↑ | A | 75 | 8.37 | 89.59 | 0.29 | 1.58 | 0.16 | 20 | 161.3 | Poor | Poor |

Table 6 shows that in the samples of Examples 81 to 85 within the scope of preferred embodiments of the present invention, in which the poly(vinyl butyral) resin was used as a resin, and methoxybutanol, 1,3-butanediol, and/or ethylene glycol was used as a solvent, the "sedimentation rate" was as low as about 33.4%/h or less, and the "long-term stability" and "ejection performance/printability" were rated as "good".

By contrast, in the samples of Comparative Examples 86 to 89 outside the scope of preferred embodiments of the present invention, in which the poly(vinyl butyral) resin was used as a resin, and EKINEN, isopropyl alcohol, or ethanol was used as a solvent, the "sedimentation rate" was as high as about 155.2%/h or more, and the "long-term stability" and "ejection performance/printability" were rated as "poor".

Experimental Example 7

A disappearing ink in Experimental Example 7 included Pigment Blue 15:3 as an organic material powder.

As in Experimental Example 1, the disappearing ink included an aqueous cellulose resin, more specifically, the cellulose resin "hydroxypropyl cellulose" manufactured by Nippon Soda Co., Ltd. as a resin.

Disappearing inks of Examples 91 to 95 and Comparative Examples 96 to 99 with the compositions listed in Table 7 were prepared as samples in the same or substantially the same manner as in Experimental Example 1.

TABLE 7

| | | Organic material | Solvent | PVC | Percentage of organic material (mass %) | Percentage of solvent (mass %) | Percentage of dispersant (mass %) | Percentage of resin (mass %) | Percentage of plasticizer (mass %) | 1000 s$^{-1}$ viscosity (mPa · s) | Sedimentation rate (%/h) | Long-term stability | Ejection performance/printability |
|---|---|---|---|---|---|---|---|---|---|---|---|---|---|
| Example | 91 | Blue-15:3 | B | 80 | 8.35 | 90.17 | 0.54 | 0.85 | 0.08 | 20 | 41.7 | Good | Good |
| | 92 | ↑ | E | ↑ | ↑ | ↑ | ↑ | ↑ | ↑ | 25 | 42.2 | Good | Good |
| | 93 | ↑ | F | ↑ | ↑ | ↑ | ↑ | ↑ | ↑ | 25 | 46.2 | Good | Good |
| | 94 | ↑ | B + F | ↑ | ↑ | ↑ | ↑ | ↑ | ↑ | 25 | 44.1 | Good | Good |
| | 95 | ↑ | B | 75 | 8.34 | 89.66 | 0.54 | 1.32 | 0.13 | 30 | 46.3 | Good | Good |
| Comparative example | 96 | Blue-15:3 | A | 80 | 8.35 | 90.17 | 0.54 | 0.85 | 0.08 | 20 | 151.3 | Poor | Poor |
| | 97 | ↑ | C | ↑ | ↑ | ↑ | ↑ | ↑ | ↑ | 20 | 137.9 | Poor | Poor |
| | 98 | ↑ | D | ↑ | ↑ | ↑ | ↑ | ↑ | ↑ | 20 | 148.2 | Poor | Poor |
| | 99 | ↑ | A | 75 | 8.34 | 89.66 | 0.54 | 1.32 | 0.13 | 20 | 144.2 | Poor | Poor |

Table 7 shows that in the samples of Examples 91 to 95 within the scope of preferred embodiments of the present invention, in which the aqueous cellulose resin was used as a resin, and methoxybutanol, 1,3-butanediol, and/or ethylene glycol was used as a solvent, the "sedimentation rate" was as low as about 46.3%/h or less, and the "long-term stability" and "ejection performance/printability" were rated as "good".

By contrast, in the samples of Comparative Examples 96 to 99 outside the scope of preferred embodiments of the present invention, in which the aqueous cellulose resin was used as a resin, and EKINEN, isopropyl alcohol, or ethanol was used as a solvent, the "sedimentation rate" was as high as about 137.9%/h or more, and the "long-term stability" and "ejection performance/printability" were rated as "poor".

Although not shown in Table 7, also in Experimental Example 7, the use of a non-aqueous cellulose resin, such as ethyl cellulose, for example, instead of the aqueous cellulose resin, such as hydroxypropyl cellulose, for example, increased the sedimentation rate by about 10% to about 20%.

Experimental Example 8

In Experimental Example 8, disappearing inks of Examples 101 to 105 and Comparative Examples 106 to 109 with the compositions listed in Table 8 were prepared as samples in the same or substantially the same manner as in Experimental Example 7, except that an acrylic resin was used as a resin in the disappearing inks. More specifically, as in Experimental Example 2, the acrylic resin was "Dianal" manufactured by Mitsubishi Chemical Corporation.

TABLE 8

| | | | | | Composition | | | | | | Characteristics | | |
|---|---|---|---|---|---|---|---|---|---|---|---|---|---|
| | | Organic material | Solvent | PVC | Percentage of organic material (mass %) | Percentage of solvent (mass %) | Percentage of dispersant (mass %) | Percentage of resin (mass %) | Percentage of plasticizer (mass %) | $1000\ s^{-1}$ viscosity (mPa·s) | Sedimentation rate (%/h) | Long-term stability | Ejection performance/printability |
| Example | 101 | Blue-15:3 | B | 80 | 8.35 | 90.17 | 0.54 | 0.85 | 0.08 | 20 | 48.3 | Good | Good |
| | 102 | ↑ | E | ↑ | ↑ | ↑ | ↑ | ↑ | ↑ | 25 | 47.2 | Good | Good |
| | 103 | ↑ | F | ↑ | ↑ | ↑ | ↑ | ↑ | ↑ | 25 | 46.7 | Good | Good |
| | 104 | ↑ | B + F | ↑ | ↑ | ↑ | ↑ | ↑ | ↑ | 25 | 45.2 | Good | Good |
| | 105 | ↑ | B | 75 | 8.34 | 89.66 | 0.54 | 1.32 | 0.13 | 30 | 44.6 | Good | Good |
| Comparative example | 106 | Blue-15:3 | A | 80 | 8.35 | 90.17 | 0.54 | 0.85 | 0.08 | 20 | 160.3 | Poor | Poor |
| | 107 | ↑ | C | ↑ | ↑ | ↑ | ↑ | ↑ | ↑ | 20 | 170.3 | Poor | Poor |
| | 108 | ↑ | D | ↑ | ↑ | ↑ | ↑ | ↑ | ↑ | 20 | 163.4 | Poor | Poor |
| | 109 | ↑ | A | 75 | 8.34 | 89.66 | 0.54 | 1.32 | 0.13 | 20 | 164.8 | Poor | Poor |

Table 8 shows that in the samples of Examples 101 to 105 within the scope of preferred embodiments of the present invention, in which the acrylic resin was used as a resin, and methoxybutanol, 1,3-butanediol, and/or ethylene glycol was used as a solvent, the "sedimentation rate" was as low as about 48.3%/h or less, and the "long-term stability" and "ejection performance/printability" were rated as "good".

By contrast, in the samples of Comparative Examples 106 to 109 outside the scope of preferred embodiments of the present invention, in which the acrylic resin was used as a resin, and EKINEN, isopropyl alcohol, or ethanol was used as a solvent, the "sedimentation rate" was as high as about 160.3%/h or more, and the "long-term stability" and "ejection performance/printability" were rated as "poor".

Experimental Example 9

In Experimental Example 9, disappearing inks of Examples 111 to 115 and Comparative Examples 116 to 119 with the compositions listed in Table 9 were prepared as samples in the same or substantially the same manner as in Experimental Example 7, except that a poly(vinyl butyral) was used as a resin in the disappearing inks. More specifically, as in Experimental Example 3, the poly(vinyl butyral) resin was "S-Lec" manufactured by Sekisui Chemical Co., Ltd.

TABLE 9

| | | Organic material | Solvent | PVC | Composition Percentage of organic material (mass %) | Percentage of solvent (mass %) | Percentage of dispersant (mass %) | Percentage of resin (mass %) | Percentage of plasticizer (mass %) | Characteristics 1000 s$^{-1}$ viscosity (mPa · s) | Sedimentation rate (%/h) | Long-term stability | Ejection performance/ printability |
|---|---|---|---|---|---|---|---|---|---|---|---|---|---|
| Example | 111 | Blue-15:3 | B | 80 | 8.35 | 90.17 | 0.54 | 0.85 | 0.08 | 20 | 50.4 | Good | Good |
| | 112 | ↑ | E | ↑ | ↑ | ↑ | ↑ | ↑ | ↑ | 25 | 49.2 | Good | Good |
| | 113 | ↑ | F | ↑ | ↑ | ↑ | ↑ | ↑ | ↑ | 25 | 48.4 | Good | Good |
| | 114 | ↑ | B + F | ↑ | ↑ | ↑ | ↑ | ↑ | ↑ | 25 | 51.8 | Good | Good |
| | 115 | ↑ | B | 75 | 8.34 | 89.66 | 0.54 | 1.32 | 0.13 | 30 | 49.4 | Good | Good |
| Comparative example | 116 | Blue-15:3 | A | 80 | 8.35 | 90.17 | 0.54 | 0.85 | 0.08 | 20 | 170.4 | Poor | Poor |
| | 117 | ↑ | C | ↑ | ↑ | ↑ | ↑ | ↑ | ↑ | 20 | 172.2 | Poor | Poor |
| | 118 | ↑ | D | ↑ | ↑ | ↑ | ↑ | ↑ | ↑ | 20 | 173.2 | Poor | Poor |
| | 119 | ↑ | A | 75 | 8.34 | 89.66 | 0.54 | 1.32 | 0.13 | 20 | 171.9 | Poor | Poor |

Table 9 shows that in the samples of Examples 111 to 115 within the scope of preferred embodiments of the present invention, in which the poly(vinyl butyral) resin was used as a resin, and methoxybutanol, 1,3-butanediol, and/or ethylene glycol was used as a solvent, the "sedimentation rate" was as low as about 51.8%/h or less, and the "long-term stability" and "ejection performance/printability" were rated as "good".

By contrast, in the samples of Comparative Examples 116 to 119 outside the scope of preferred embodiments of the present invention, in which the poly(vinyl butyral) resin was used as a resin, and EKINEN, isopropyl alcohol, or ethanol was used as a solvent, the "sedimentation rate" was as high as about 170.4%/h or more, and the "long-term stability" and "ejection performance/printability" were rated as "poor".

Experimental Example 10

A disappearing ink in Experimental Example 10 included a spherical particulate polymer as an organic material powder.

As in Experimental Example 1, the disappearing ink included an aqueous cellulose resin, more specifically, the hydroxypropyl cellulose resin "hydroxypropyl cellulose" manufactured by Nippon Soda Co., Ltd. as a resin.

Disappearing inks of Examples 121 to 125 and Comparative Examples 126 to 129 with the compositions listed in Table 10 were prepared as samples in the same or substantially the same manner as in Experimental Example 1.

TABLE 10

| | | Organic material | Solvent | PVC | Composition Percentage of organic material (mass %) | Percentage of solvent (mass %) | Percentage of dispersant (mass %) | Percentage of resin (mass %) | Percentage of plasticizer (mass %) | Characteristics 1000 s$^{-1}$ viscosity (mPa · s) | Sedimentation rate (%/h) | Long-term stability | Ejection performance/ printability |
|---|---|---|---|---|---|---|---|---|---|---|---|---|---|
| Example | 121 | Spherical particulate polymer | B | 80 | 6.10 | 92.37 | 0.43 | 1.00 | 0.10 | 20 | 7.5 | Good | Good |
| | 122 | ↑ | E | ↑ | ↑ | ↑ | ↑ | ↑ | ↑ | 25 | 8.9 | Good | Good |
| | 123 | ↑ | F | ↑ | ↑ | ↑ | ↑ | ↑ | ↑ | 25 | 9.4 | Good | Good |
| | 124 | ↑ | B + F | ↑ | ↑ | ↑ | ↑ | ↑ | ↑ | 25 | 9.2 | Good | Good |
| | 125 | ↑ | B | 75 | 6.09 | 91.85 | 0.43 | 1.48 | 0.15 | 30 | 8.2 | Good | Good |
| Comparative example | 126 | Spherical particulate polymer | A | 80 | 6.10 | 92.37 | 0.43 | 1.00 | 0.10 | 20 | 170.4 | Poor | Poor |
| | 127 | ↑ | C | ↑ | ↑ | ↑ | ↑ | ↑ | ↑ | 20 | 172.2 | Poor | Poor |
| | 128 | ↑ | D | ↑ | ↑ | ↑ | ↑ | ↑ | ↑ | 20 | 173.2 | Poor | Poor |
| | 129 | ↑ | A | 75 | 6.09 | 91.85 | 0.43 | 1.48 | 0.15 | 20 | 171.9 | Poor | Poor |

Table 10 shows that in the samples of Examples 121 to 125 within the scope of preferred embodiments of the present invention, in which the aqueous cellulose resin was used as a resin, and methoxybutanol, 1,3-butanediol, and/or ethylene glycol was used as a solvent, the "sedimentation rate" was as low as about 9.4%/h or less, and the "long-term stability" and "ejection performance/printability" were rated as "good".

By contrast, in the samples of Comparative Examples 126 to 129 outside the scope of preferred embodiments of the present invention, in which the aqueous cellulose resin was used as a resin, and EKINEN, isopropyl alcohol, or ethanol was used as a solvent, the "sedimentation rate" was as high as about 170.4%/h or more, and the "long-term stability" and "ejection performance/printability" were rated as "poor".

Although not shown in Table 10, also in Experimental Example 10, the use of a non-aqueous cellulose resin, ethyl cellulose, instead of the aqueous cellulose resin, hydroxypropyl cellulose, increased the sedimentation rate by about 10% to about 20%.

Experimental Example 11

In Experimental Example 11, disappearing inks of Examples 131 to 135 and Comparative Examples 136 to 139 with the compositions listed in Table 11 were prepared as samples in the same or substantially the same manner as in Experimental Example 10, except that an acrylic resin was used as a resin in the disappearing inks. More specifically, as in Experimental Example 2, the acrylic resin was "Dianal" manufactured by Mitsubishi Chemical Corporation.

TABLE 11

| | | | | | Composition | | | | | Characteristics | | |
|---|---|---|---|---|---|---|---|---|---|---|---|---|
| | | Organic material | Solvent | PVC | Percentage of organic material (mass %) | Percentage of solvent (mass %) | Percentage of dispersant (mass %) | Percentage of resin (mass %) | Percentage of plasticizer (mass %) | $1000\ s^{-1}$ viscosity (mPa·s) | Sedimentation rate (%/h) | Long-term stability | Ejection performance/printability |
| Example | 131 | Spherical particulate polymer | B | 80 | 6.10 | 92.37 | 0.43 | 1.00 | 0.10 | 20 | 10.2 | Good | Good |
| | 132 | ↑ | E | ↑ | ↑ | ↑ | ↑ | ↑ | ↑ | 25 | 10.3 | Good | Good |
| | 133 | ↑ | F | ↑ | ↑ | ↑ | ↑ | ↑ | ↑ | 25 | 11.7 | Good | Good |
| | 134 | ↑ | B + F | ↑ | ↑ | ↑ | ↑ | ↑ | ↑ | 25 | 11.3 | Good | Good |
| | 135 | ↑ | B | 75 | 6.09 | 91.85 | 0.43 | 1.48 | 0.15 | 30 | 11.8 | Good | Good |
| Comparative example | 136 | Spherical particulate polymer | A | 80 | 6.10 | 92.37 | 0.43 | 1.00 | 0.10 | 20 | 176.7 | Poor | Poor |
| | 137 | ↑ | C | ↑ | ↑ | ↑ | ↑ | ↑ | ↑ | 20 | 177.9 | Poor | Poor |
| | 138 | ↑ | D | ↑ | ↑ | ↑ | ↑ | ↑ | ↑ | 20 | 169.5 | Poor | Poor |
| | 139 | ↑ | A | 75 | 6.09 | 91.85 | 0.43 | 1.48 | 0.15 | 20 | 175.5 | Poor | Poor |

Table 11 shows that in the samples of Examples 131 to 135 within the scope of preferred embodiments of the present invention, in which the acrylic resin was used as a resin, and methoxybutanol, 1,3-butanediol, and/or ethylene glycol was used as a solvent, the "sedimentation rate" was as low as about 11.8%/h or less, and the "long-term stability" and "ejection performance/printability" were rated as "good".

By contrast, in the samples of Comparative Examples 136 to 139 outside the scope of preferred embodiments of the present invention, in which the acrylic resin was used as a resin, and EKINEN, isopropyl alcohol, or ethanol was used as a solvent, the "sedimentation rate" was as high as about 169.5%/h or more, and the "long-term stability" and "ejection performance/printability" were rated as "poor".

Experimental Example 12

In Experimental Example 12, disappearing inks of Examples 141 to 145 and Comparative Examples 146 to 149 with the compositions listed in Table 12 were prepared as samples in the same or substantially the same manner as in Experimental Example 10, except that a poly(vinyl butyral) resin was used as a resin in the disappearing inks. More specifically, as in Experimental Example 3, the poly(vinyl butyral) resin was "S-Lec" manufactured by Sekisui Chemical Co., Ltd.

TABLE 12

| | | | | | Composition | | | | | Characteristics | | |
|---|---|---|---|---|---|---|---|---|---|---|---|---|
| | | Organic material | Solvent | PVC | Percentage of organic material (mass %) | Percentage of solvent (mass %) | Percentage of dispersant (mass %) | Percentage of resin (mass %) | Percentage of plasticizer (mass %) | $1000\ s^{-1}$ viscosity (mPa·s) | Sedimentation rate (%/h) | Long-term stability | Ejection performance/printability |
| Example | 141 | Spherical particulate polymer | B | 80 | 6.10 | 92.37 | 0.43 | 1.00 | 0.10 | 20 | 11.1 | Good | Good |
| | 142 | ↑ | E | ↑ | ↑ | ↑ | ↑ | ↑ | ↑ | 25 | 13.3 | Good | Good |
| | 143 | ↑ | F | ↑ | ↑ | ↑ | ↑ | ↑ | ↑ | 25 | 13.2 | Good | Good |

TABLE 12-continued

| | | Composition | | | | | | | | Characteristics | | | |
|---|---|---|---|---|---|---|---|---|---|---|---|---|---|
| | | Organic material | Solvent | PVC | Percentage of organic material (mass %) | Percentage of solvent (mass %) | Percentage of dispersant (mass %) | Percentage of resin (mass %) | Percentage of plasticizer (mass %) | 1000 s⁻¹ viscosity (mPa · s) | Sedimentation rate (%/h) | Long-term stability | Ejection performance/ printability |
| | 144 | ↑ | B + F | ↑ | ↑ | ↑ | ↑ | ↑ | ↑ | 25 | 13.6 | Good | Good |
| | 145 | ↑ | B | 75 | 6.09 | 91.85 | 0.43 | 1.48 | 0.15 | 30 | 13.9 | Good | Good |
| Comparative example | 146 | Spherical particulate polymer | A | 80 | 6.10 | 92.37 | 0.43 | 1.00 | 0.10 | 20 | 174.3 | Poor | Poor |
| | 147 | ↑ | C | ↑ | ↑ | ↑ | ↑ | ↑ | ↑ | 20 | 175.2 | Poor | Poor |
| | 148 | ↑ | D | ↑ | ↑ | ↑ | ↑ | ↑ | ↑ | 20 | 179.3 | Poor | Poor |
| | 149 | ↑ | A | 75 | 6.09 | 91.85 | 0.43 | 1.48 | 0.15 | 20 | 178.3 | Poor | Poor |

Table 12 shows that in the samples of Examples 141 to 145 within the scope of preferred embodiments of the present invention, in which the poly(vinyl butyral) resin was used as a resin, and methoxybutanol, 1,3-butanediol, and/or ethylene glycol was used as a solvent, the "sedimentation rate" was as low as about 13.9%/h or less, and the "long-term stability" and "ejection performance/printability" were rated as "good".

By contrast, in the samples of Comparative Examples 146 to 149 outside the scope of preferred embodiments of the present invention, in which the poly(vinyl butyral) resin was used as a resin, and EKINEN, isopropyl alcohol, or ethanol was used as a solvent, the "sedimentation rate" was as high as about 174.3%/h or more, and the "long-term stability" and "ejection performance/printability" were rated as "poor".

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method for producing a multilayer ceramic electronic component that includes a component main body and an outer electrode on an outer surface of the component main body, the component main body including laminated ceramic layers and an internal electrode along an interface between the ceramic layers, and the outer electrode being electrically connected to the internal electrode, the method comprising:
   a first stage of producing a green multilayer ceramic electronic component; and
   a second stage of producing a sintered multilayer ceramic electronic component from the green multilayer ceramic electronic component; wherein
   the first stage includes:
      preparing a disappearing ink including a material that disappears by heating, a ceramic-containing ink that is to be fired to form the ceramic layers, a first metal-containing ink that is to be fired to form the internal electrode, and a second metal-containing ink that is to be fired to form the outer electrode;
      ejecting the disappearing ink by an ink jet method to form a support that defines at least a portion of a peripheral shape of the green multilayer ceramic electronic component;
      ejecting the ceramic-containing ink by the ink jet method to form a green ceramic layer, which is to be one of the ceramic layers;
      ejecting the first metal-containing ink by the ink jet method to form a green internal electrode, which is to be the internal electrode; and
      ejecting the second metal-containing ink by the ink jet method to form a green outer electrode, which is to be the outer electrode; wherein
      the forming the green ceramic layer and the forming the green outer electrode are performed while the support defines at least a portion of a periphery of the green ceramic layer and the green outer electrode, respectively;
   in the first stage, the support is formed to include a plurality of layers that are stacked on each other along the peripheral surface of the green multilayer ceramic electronic component; and
   the second stage includes:
      causing the support to disappear by heating; and
      sintering the green multilayer ceramic electronic component.

2. The method for producing the multilayer ceramic electronic component according to claim 1, wherein the forming the support is performed multiple times, the forming the green ceramic layer is performed multiple times, and the forming the green outer electrode is performed multiple times.

3. The method for producing the multilayer ceramic electronic component according to claim 2, wherein the forming the green ceramic layer is performed after the forming the support, and the forming the green outer electrode is performed after each of the multiple times of the forming the support.

4. The method for producing the multilayer ceramic electronic component according to claim 3, wherein the forming the green internal electrode is performed multiple times.

5. The method for producing the multilayer ceramic electronic component according to claim 1, wherein the first stage includes ejecting the ceramic-containing ink by the ink jet method to form a green step compensation layer with a same or substantially a same thickness as the green internal electrode formed in the forming the green internal electrode.

6. The method for producing a multilayer ceramic electronic component according to claim 1, wherein at least the forming the support, the forming the green outer electrode, the forming the green ceramic layer, the forming the support, the forming the green outer electrode, and the forming the green internal electrode are repeated in this order in the first stage.

7. The method for producing a multilayer ceramic electronic component according to claim 1, wherein the second stage successively includes the heating the green multilayer ceramic electronic component and the firing the green multilayer ceramic electronic component.

8. The method for producing a multilayer ceramic electronic component according to claim 1, wherein
the disappearing ink includes:
an organic material powder including at least one of an organic pigment or a particulate polymer;
a polycarboxylic acid copolymer as a dispersant;
at least one of methoxybutanol, ethylene glycol, or 1,3-butanediol as a solvent; and
at least one of cellulose resins, acrylic resins, or poly (vinyl butyral) resins as a resin.

9. The method for producing a multilayer ceramic electronic component according to claim 8, wherein a ratio of a volume of the organic material powder to a total volume of the organic material powder and the resin is about 60% to about 90%.

10. The method for producing a multilayer ceramic electronic component according to claim 8, wherein the organic pigment includes at least one of quinacridones, Pigment Yellow 180, or copper phthalocyanines.

11. The method for producing a multilayer ceramic electronic component according to claim 8, wherein a ratio of a volume of the organic material powder to a total volume of the organic material powder and the resin is about 75% to about 80%.

12. The method for producing a multilayer ceramic electronic component according to claim 8, wherein the disappearing ink includes hydroxypropyl cellulose.

13. The method for producing a multilayer ceramic electronic component according to claim 1, wherein the ceramic-containing ink includes a ceramic powder including at least one of $SrTiO_3$, $CaZrO_3$, $MgO$, $SiO_2$, $Al_2O_3$, $Cr_2O_3$, $MnO_2$, $Y_2O_3$, $CaTi$, $ZrO_3$, $SrZrO_3$, $BaTiO_3$, $BaTi$, or $CaO_3$.

14. The method for producing a multilayer ceramic electronic component according to claim 1, wherein the first metal-containing ink includes a metal powder including at least one of Ni, Fe, Cu, Al, Ag, W, C, Au, Sn, Pd, Pt, Mn, Li, or Si.

15. The method for producing a multilayer ceramic electronic component according to claim 1, wherein the second metal-containing ink includes a metal powder including at least one of Ni, Fe, Cu, Al, Ag, W, C, Au, Sn, Pd, Pt, Mn, Li, or Si.

* * * * *